J. C. PORTER.
Self-Setting Animal-Trap.
No. 165,023.                       Patented June 29, 1875.
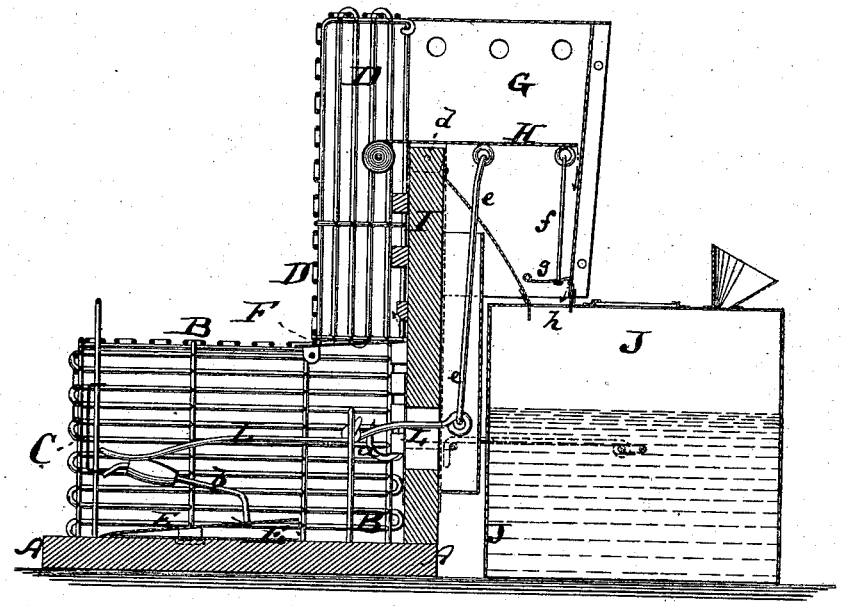

UNITED STATES PATENT OFFICE.

JOHN C. PORTER, OF NEW YORK, N. Y.

IMPROVEMENT IN SELF-SETTING ANIMAL-TRAPS.

Specification forming part of Letters Patent No. 165,023, dated June 29, 1875; application filed September 17, 1874.

*To all whom it may concern:*

Be it known that I, JOHN C. PORTER, of New York, in the county of New York and State of New York, have invented a new and Improved Self-Setting Animal-Trap, of which the following is a specification:

The drawing represents a vertical longitudinal section of my improved self-setting animal-trap.

This invention relates to a new trap for catching mice, rats, and other animals, the same being so arranged that every animal caught therein will set the trap again for its successor.

The invention consists in the peculiar arrangement of parts, hereinafter more specially described.

In the drawing, the letter A represents the base-plate of the trap. B is the wire casing or body of the trap. C is a sliding gate, arranged at the front end of the trap, to open or close the entrance to the same. This gate when raised, as in the drawing, opens the trap, and may be arranged to slide in a vertical or inclined direction. Over the trap proper extends a passage, D, upwardly, as shown. The bait is placed on a hook, $a$, which is secured in the trap beneath the passage D. Between this bait-hook $a$ and the entrance or gate C is placed, on the bottom A of the trap, a tilting platform, E, which platform is weighted at the end nearest the gate, to be normally in the position shown in the drawing. An arm, $b$, which projects from this tilting platform E catches under an inwardly-projecting ear of the gate C, and holds said gate elevated and open, as shown.

When the animal enters the trap it must pass, in order to reach the bait, over this tilting platform E, and when it reaches the elevated inner end of said platform it weighs the same down, causing it to swing and to carry the arm $b$ away from under the gate C, thus allowing said gate to drop and close the trap. The animal is thus made a prisoner within the trap, and while in the same it cannot, by any means, open the gate and escape. The only means of escape left from the trap is through the vertical passage D. In order to reach this passage D the animal must first raise a pivoted door, F, which, by its own weight, swings into the position shown in the drawing, forming a barrier between the trap proper and the passage D, but the animal can readily swing it open from beneath and enter the passage D. When it has entered this passage the door F swings closed again, and prevents the animal from re-entering the trap proper.

The passage D leads into a horizontal passage, G, of which the bottom is formed by a weighted platform, H, pivoted at $d$ to a standard or pillar, I, that projects from the base A of the trap. The pivoted platform H is weighted at its shorter front end.

An animal reaching the passage G must necessarily step on the platform H, and, when on the rear end of the same, will tilt it, and will thereby be precipitated downward into a tank, J, which is placed under the rear end of the passage G for the reception of the prisoner.

An arm, $e$, connects the under side of the platform H with a lever, L, which extends through the trap proper toward the gate C, and whenever the platform H is swung down in the manner stated the lever L will be swung, so as to raise the gate C with its front end by contact with a projecting ear on the gate. The trap is thus reset whenever an animal is deposited within the tank J.

For greater security the platform may be connected, by a rod, $f$, with a lower platform, $g$, as shown, so that both H and $g$ will move simultaneously in dropping an animal. The object of the platform or gate $g$ is to prevent the animal from reaching the under side of the platform H by ascending into the tank, and thus obstructing the free movement of H and preventing the discharge into the tank of the succeeding prisoner.

The tank J may be filled with water or other substance for drowning or otherwise killing the animals caught therein, or it may be merely used as a receptacle for the living prisoners, and can be removed from the trap whenever desired, the entrance or opening leading to it being closed by a suitable slide whenever the tank is to be removed.

I claim as my invention—

The self-setting animal-trap, composed of the sliding gate C, tilting platform E, arm b, weighted platform H, rod e, lever L, and the tank J, all arranged for operation substantially as herein shown and described.

The above description of my invention signed by me this 14th day of September, 1874.

JOHN C. PORTER.

Witnesses:
 A. V. BRIESEN,
 MICHAEL RYAN.